United States Patent [19]

Sarradin

[11] Patent Number: 5,574,271
[45] Date of Patent: Nov. 12, 1996

[54] ELECTRONIC TERMINAL WITH MEMORY-CARD READER

[75] Inventor: Jean-Louis Sarradin, Fontenay en Parisis, France

[73] Assignee: Societe D'Applications D'Electricite et de Mecanique SAGEM, France

[21] Appl. No.: 305,090

[22] Filed: Sep. 13, 1994

[30] Foreign Application Priority Data

Sep. 14, 1993 [FR] France ................................. 93 10911

[51] Int. Cl.$^6$ ........................................................ G06K 7/06
[52] U.S. Cl. ................................................ 235/441; 439/630
[58] Field of Search ................................ 235/441; 361/735, 361/752; 439/59, 74, 630, 631

[56] References Cited

U.S. PATENT DOCUMENTS

| | | |
|---|---|---|
| 4,675,516 | 6/1987 | Guion ........................................ 235/441 |
| 4,849,615 | 7/1989 | Mollet ..................................... 235/441 X |
| 5,252,815 | 10/1993 | Pernet ...................................... 235/441 |
| 5,257,414 | 10/1993 | Trahan et al. ........................... 235/441 X |
| 5,266,782 | 11/1993 | Alänärä et al. ............................. 235/380 |
| 5,325,429 | 6/1994 | Kurgan ................................... 235/441 X |
| 5,334,827 | 8/1994 | Bleier et al. ............................ 235/441 X |

FOREIGN PATENT DOCUMENTS

| | | |
|---|---|---|
| 0274302 | 7/1988 | European Pat. Off. . |
| 0480334 | 4/1992 | European Pat. Off. . |
| 2685967 | 7/1993 | France . |
| 0147386 | 7/1986 | Japan ....................................... 235/441 |
| 0136183 | 6/1988 | Japan ....................................... 235/441 |

Primary Examiner—Donald T. Hajec
Assistant Examiner—Steven Wigmore
Attorney, Agent, or Firm—Graham & James LLP

[57] ABSTRACT

An electronic terminal comprising a housing (1) having a receptacle (2) adapted to receive a memory card (21) having a connection region (22) and to permit the cooperation of connecting element (10) of the terminal with the connection region of the card (21), in which the receptacle (22) is defined by at least one wall (3–5) of the housing (1).

Application to electronic payment terminals.

3 Claims, 1 Drawing Sheet

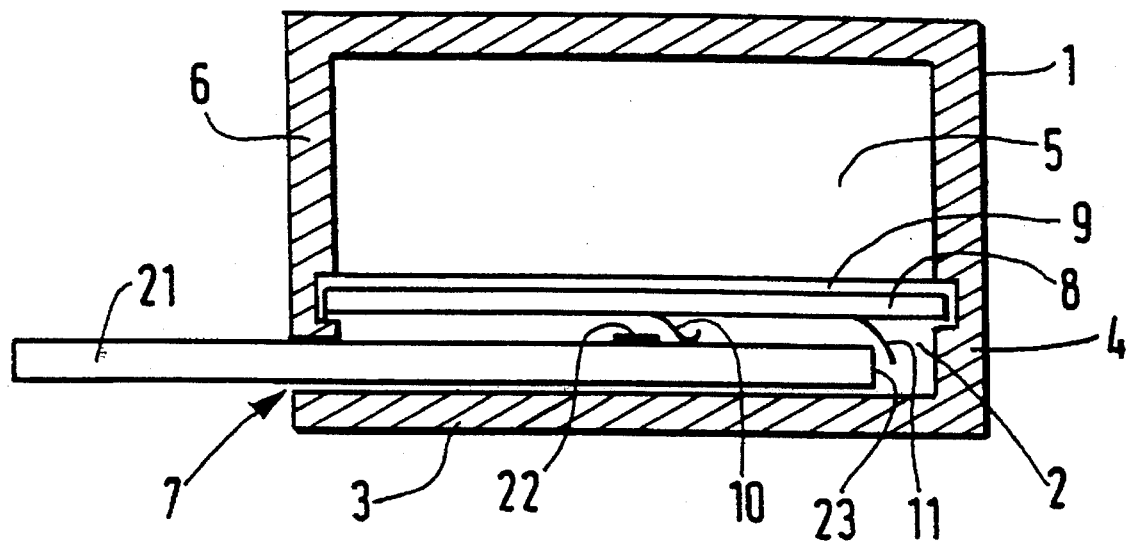
FIGURE

ELECTRONIC TERMINAL WITH MEMORY-CARD READER

BACKGROUND OF THE INVENTION

The use of memory cards and, in particular smart cards, is increasing today in numerous applications such as electronic payment, access control, or mobile radio communications.

In order to use a terminal of a given application, a user introduces his card into the terminal, which reads data stored in the card in order to verify the validity of the card and which, depending on the application, records therein the cost of the operation, for instance the cost of a telephone call.

To effect this reading, the terminal has a smart-card reader comprising a receptacle to receive the card, within which receptacle contacts are arranged which are adapted to cooperate with a connecting field of the smart card.

The receptacle is defined by walls for guiding the smart card, although the space taken up by the receptacle is far greater than the size of the smart card which it receives. Now, it is frequently desirable that the terminal be of reduced size, particularly if it is portable.

SUMMARY OF THE INVENTION

The present invention is directed at reducing the size of this receptacle.

For this purpose, the invention concerns an electronic terminal comprising a housing having a receptacle adapted to receive a memory card having a connecting region and to permit cooperation of connecting means of the terminal with the connecting area of the card, characterized by the fact that the receptacle is defined by at least one wall of the housing.

Thus, the housing of the terminal directly serves a card guiding function.

The receptacle is advantageously limited by an electronic card bearing the connecting means.

In particular, the receptacle can be limited by three faces of the housing which are complementary with the face presented by the electronic card, such an arrangement assuring the guiding of the memory card without it being necessary to provide additional elements, which would therefore increase its size.

BRIEF DESCRIPTION OF THE DRAWINGS

The invention will be better understood by means of the following description of the preferred embodiment of the terminal of the invention, read with reference to the sole FIGURE of the accompanying drawing which shows a side view in cross section thereof.

DETAILED DESCRIPTION OF A PREFERRED EMBODIMENT

The electronic terminal which is to be described comprises a housing 1, in this case having the general shape of a rectangular parallelepiped, comprising a receptacle 2 to receive a memory card, in this case a smart card 21. The receptacle 2 which is of a size just sufficient to receive at least part of the smart card 21 is defined by a bottom wall 3, a rear wall 4, and two side walls, only one of which, 5, is shown in the drawing, of the housing 1. A slot 7 in the front wall 6 of the housing 1 permits the introduction of the smart card 21 into the receptacle 2. On the side opposite the bottom wall 3, the receptacle 2 is limited by an electronic printed-circuit card 8 which is fastened to the housing 1, in this case by means of grooves 9 formed in the housing 1.

The electronic card 8 bears a number of contacts 10 arranged to cooperate with a connecting region 22 on the smart card 21. The contacts 10 are elastic blades which protrude slightly into the receptacle 2. In the presence of the card, the blades 10 are pushed back by the face of the smart card 21 which faces the card 8. Near the rear wall 4, the electronic card 8 bears a detector 11 for the presence of a card, in this case in the form of a flexible blade which protrudes into the receptacle 2 and is intended to be pushed back against an associated contact and thus supply a signal indicating the presence of a card when the front edge 23 of the smart card 21 approaches the end wall 4 before striking against it. In this position, the connecting region 22 of the smart card 21 cooperates with the contacts 10.

In operation, the housing 1 assures a guiding of the smart card 21, in this case on three sides, and the electronic card 8 limits the receptacle 2 and thus also guides the smart card 21. The signal of the detector 11 serves to activate reading/writing circuits of the electronic card 8 which are connected to the contacts 10.

The detector 11 for the presence of a card could also be mounted on the housing 1, for instance on the rear wall 4, and be connected by wires to the card 10.

Likewise, the contacts 10 could have been fastened on the bottom wall 3.

I claim:

1. An electronic terminal comprising a housing (1) containing a separate enclosed receptacle chamber (2) therein, said receptacle chamber being adapted to receive a memory card (21) having a connecting region (22) and to permit cooperation of connecting means (10) of the terminal with the connection region of the card (21), wherein the receptacle chamber (2) is defined by at least one wall (3–5) in common with at least part of one wall of the housing (1) but less than all walls of the housing, wherein the receptacle chamber (2) is defined by a wall, within said housing, comprised of an electronic card (8), with said card having the connecting means (10) directly mounted thereon, and wherein the electronic card (8), with the connecting means (10) directly mounted thereon, is positioned to directly face the memory card received within the receptacle chamber.

2. A terminal according to claim 1 in which the receptacle chamber (2) is defined by a wall, within said housing, comprised of an electronic card (8) which bears the connecting means (10).

3. A terminal according to claim 2, wherein the receptacle chamber contains a detector (11) for presence of a card within the receptacle chamber; with said detector being adapted to cooperate with a front edge (23) of the memory card (21).

\* \* \* \* \*